April 11, 1950 J. A. RAJCHMAN ET AL 2,503,765

ELECTRONIC ADDER

Filed June 26, 1947 2 Sheets-Sheet 1

INVENTOR.
Jan A. Rajchman
& George W. Brown
BY J. I. Huff
ATTORNEY.

April 11, 1950 J. A. RAJCHMAN ET AL 2,503,765

ELECTRONIC ADDER

Filed June 26, 1947 2 Sheets-Sheet 2

INVENTOR.
Jan A. Rajchman
& George W. Brown

BY J. [signature]

ATTORNEY.

Patented Apr. 11, 1950

2,503,765

UNITED STATES PATENT OFFICE 2,503,765

ELECTRONIC ADDER

Jan A. Rajchman, Princeton, N. J., and George W. Brown, Ames, Iowa, assignors to Radio Corporation of America, a corporation of Delaware Application June 26, 1947, Serial No. 757,262

19 Claims. (Cl. 235—61)

This invention relates to computing systems of the type disclosed in U. S. Patent 2,404,250, issued July 16, 1946, to Jan A. Rajchman. It has for its principal object the provision of an improved computing circuit and method of operation whereby the sum or difference of a plurality of numbers is readily derived.

All the computations are performed in terms of numbers and in the binary system of numeration in which a number is expressed as a sum of powers of two multiplied by coefficients which are either zero or one. Thus integers "$x$" are represented by the series $$x=a_0(x)2^0+a_1(x)2^1+a_2(x)2^2+\ldots+a_n(x)2^n+\ldots$$

where the coefficient $a_n(x)$ is either zero or one.

Using the usual order of writing digits, as in the decimal system, the $2^0$ place is on the right, and the $2^1, 2^2$, . . . etc., places successively to the left. In the decimal system the "units," "tens," "hundreds," etc., places read from right to left. Similarly in the binary system the places, from right to left, are "units," "twos," "fours," "eights," etc.

Thus, the number 6 may be written

0110 which states that the number contains no units, one "two" and one "four," for a total of 6. Similarly the number 7 would be written

0111 which adds one "unit" to the number six for a total of 7.

Addition in the binary system is done as in the decimal system taking into account the "carry-over." Thus the sum of 6 and 7 is obtained as follows:

```
carry over
    6=0110
    7=0111
    —  ————
   13=1101
```

A generalization of the addition of two binary numbers $x$ and $y$ may be written:

$$\begin{array}{cccccccc}
\overset{c_n}{\longleftarrow} & & \overset{c_{n-1}}{\longleftarrow} & & \overset{c_1}{\longleftarrow} & & \overset{c_0}{\longleftarrow} & \\
\cdots a_n(x) & \cdots & a_2(x) & \cdots & a_1(x) & \cdots & a_0(x) \\
\cdots a_n(y) & \cdots & a_2(y) & \cdots & a_1(y) & \cdots & a_0(y) \\
\hline
\cdots a_n(x+y) & \cdots & a_2(x+y) & \cdots & a_1(x+y) & \cdots & a_0(x+y)
\end{array}$$

where $a_n(x)$ and $a_n(y)$ are either zero or one.

The following relations may be observed:

*Table I*

(a) If $a_0(x)$ and $a_0(y)$ are both zero, $c_0=0$ and $a_0(x+y)=0$ (b) If one and only one of $a_0(x)$ and $a_0(y)$ is one, $c_0=0$ and $a_0(x+y)=1$ (c) If $a_0(x)$ and $a_0(y)$ are both one, then $c_0=1$ and $a_0(x+y)=0$ (d) If $a_n(x)$, $a_n(y)$ and $c_{n-1}$ are all zero, then $c_n=0$ and $a_n(x+y)=0$ (e) If only one of $a_n(x)$, $a_n(y)$ and $c_{n-1}$ is one, then $c_n=0$ and $a_n(x+y)=1$ (f) If any two of $a_n(x)$, $a_n(y)$ and $c_{n-1}$ are one, then $c_n=1$ and $a_n(x+y)=0$ (g) If all three are each equal to one, then $c_n=1$ and $a_n(x+y)=1$ Thus it may be seen that the carry-over sequence is such that each $c_n$ is determined by $a_n(x)$, $a_n(y)$ and $c_{n-1}$, according to a non-linear functional relationship which assigns to $c_n$ the value "one" if and only if two or more of $a_n(x)$, $a_n(y)$ and $c_{n-1}$ have the value "one." the digit $a_n(x+y)$ is obtained by the linear relation:

$$a_n(x+y)=a_n(x)+a_n(y)+c_{n-1}-2c_n$$

It is a further object of this invention to provide an improved apparatus for and method of adding two numbers the digits of which are represented by two voltages $V_1$ and $V_2$, in which the voltage $V_1$ is arbitrarily chosen to represent the digit "zero" and the voltage $V_2$ is arbitrarily chosen to represent the digit "one" in the binary system of computation.

It is a further object of this invention to provide an improved apparatus for and method of adding two voltages $V_1$ and $V_2$ representing the digits $a_n(x)$ and $a_n(y)$ of the binary numbers $x$ and $y$ so as to take into account the carry-over voltage $c_{n-1}$ from the preceding digital place.

It is a still further object of this invention to accomplish the above objects with an apparatus utilizing only one vacuum tube per digital place.

A still further object is the provision of an electronic adder having $n$ devices representing $n$ digital places in the binary system of numeration, and means for applying to said devices input voltages representative of the values of the corresponding digits of two binary numbers to produce output voltages representative of the sum of said two binary numbers.

In the decimal system it is well known that a number $y$ may be subtracted from a number $x$ by subtracting each digit of the number $y$ from 9, adding this to $x$, dropping the number in the highest digital place and adding 1. Thus $$\begin{array}{rrr} x= & 2137= & 2137 \\ -y= & -125 & +9874 \\ \hline & 2012 & 2011 \\ & & +1 \\ \hline & & 2012 \end{array}$$

In the binary system this method is greatly simplified, since each digit of "$y$" is subtracted from 1. Thus each "0" becomes "1" and each "1" becomes "0." For example $$\begin{array}{rrrr} x= & 11= & 1011= & 1011 \\ -y= & -9= & -1001= & +0110 \\ \hline & 2 & 0010 & 0001 \\ & & & +1 \\ \hline & & & 0010 \end{array}$$

Consequently in an electronic adder, subtraction may be accomplished simply by reversing or interchanging the voltages $V_1$ and $V_2$ representing the number to be subtracted, adding in the normal manner, dropping the number in the highest digital place, and adding one.

It is therefore a further object of this invention to provide an apparatus for and method of subtracting one number from another, and in particular to accomplish this object by the equivalent additive process in which means is provided for automatically adding 1 to the sum, for the reasons set forth above.

The novel features that are considered characteristic of this invention are set forth with particularity in the appended claims. The invention both as to its organization and method of operation, as well as additional objects and advantages thereof, will best be understood from a consideration of the following description and the accompanying drawings, in which Figure 1 is a circuit diagram of a switching system for a digital adder according to the invention;

Figure 1:
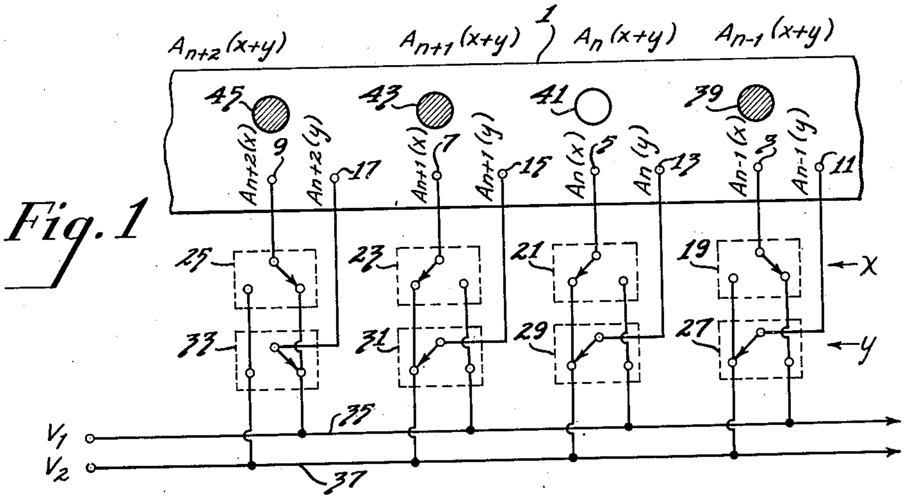

Referring to Fig. 1, there is illustrated in schematic form an electronic adder 1 which consists of a plurality of identical stages, one for each digit, the number of stages being dependent upon the desired capacity of the device. Since all stages are identical only four have been illustrated. It will be understood that the four stages illustrated can add any two numbers expressed in the binary system of numeration where the sum does not exceed four digit places. Where $n$ places are utilized, the four illustrated are the $n^{th}$, $a_n(x+y)$; one place to the right or $a_{n-1}(x+y)$; and the two places to the left, $a_{n+1}(x+y)$ and $a_{n+2}(x+y)$ respectively. It will be observed that the places are shown in increasing powers of two reading from right to left.

For each stage of the adder two digit input terminals are provided. The first group of terminals 3, 5, 7 and 9 are for the four digits of a number $x$, while the second group of terminals 11, 13, 15 and 17 are for the four digits of a number $y$ which is to be added to $x$.

It should be noted at this point that the term "adding" is intended to include the algebraic addition of positive or negative numbers, and therefore includes subtraction.

Four single-pole-double-throw switches 19, 21, 23 and 25 are provided for the four input terminals of the $x$ group, and four similar switches 27, 29, 31 and 33 are also provided for the four input terminals of the $y$ group. These switches are all connected to a pair of leads 35 and 37, the former being at the potential $V_1$ and the latter at the potential $V_2$, with respect to ground which has not been shown for the sake of simplicity. If we now assume that the voltage $V_1$ represents the cipher "zero" and the voltage $V_2$ represents the cipher "one," it will be observed that by selectively manipulating the eight switches that two numbers of four digits each can be set into the equipment.

The total indicator may comprise a series of lamps 39, 41, 43 and 45, one for each digital place. We can then arbitrarily decide that when the lamp is lit the number "1" is represented, and when a lamp is not lit the number "0" is represented for each digit of the total.

To illustrate the use of the device, assume that the device is a four-place adder, and it is desired to add 6+7=13 in the binary system as in the preceding example. Reading from right to left, the four "$x$" switches are set as shown, applying the voltages representing 0110 to the "$x$" input terminals. Similarly the "$y$" switches are set so as to apply the voltages representing 0111 to the $y$ input terminals. The device will then cause the lamps 39, 43 and 45 to light, indicating a total of 1101.

It should be noted that the input switches may be operated simultaneously or in any desired predetermined or arbitrary sequence, and the result will not be affected. It will also be apparent that subtraction by the process described above may be accomplished simply by reversing the sense of each input switch of the number to be subtracted and adding 1 to the total. This may be accomplished either by physically reversing the position of each switch of the $y$ group or in the manner illustrated in Fig. 2, to which reference is now made.

Figure 2:
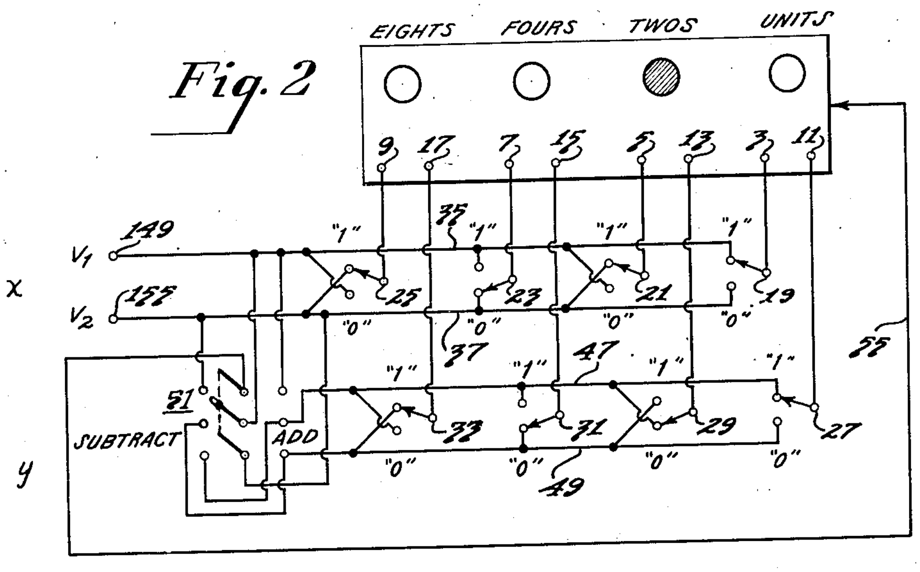
Figure 2 is a circuit diagram of a modified switching system.

In Fig. 2, the adder 1 includes four places, as before. The four switches 19, 21, 23 and 25 are also connected to the leads 35, 37 as before, except that in this case the convention that $V_1=0$ and $V_2=1$ is reversed at successive stages, for a reason that will appear subsequently. The $y$ group of switches, however, are connected in alternate order to an additional pair of leads 47, 49, which are connected to the first leads through a polarity reversing switch 51. In its "add" position this switch simply duplicates the connections of the first group of switches. In its "subtract" position the voltages $V_1$ and $V_2$ are interchanged. Consequently when setting the "$y$" group to "zero" or "one" in accordance with the convention adopted for addition, the voltages are all interchanged automatically when the switch is thrown to the "subtract" position, and thus each digit is subtracted from 1, as explained above.

As a further convenience, the polarity-reversing switch 51 is provided with an additional contact 53 and contact arm by means of which the 1 is automatically added to the total through lead 55 leading into the "carry-over" input of the first stage, the specific connections for which will be explained subsequently.

Figure 3:
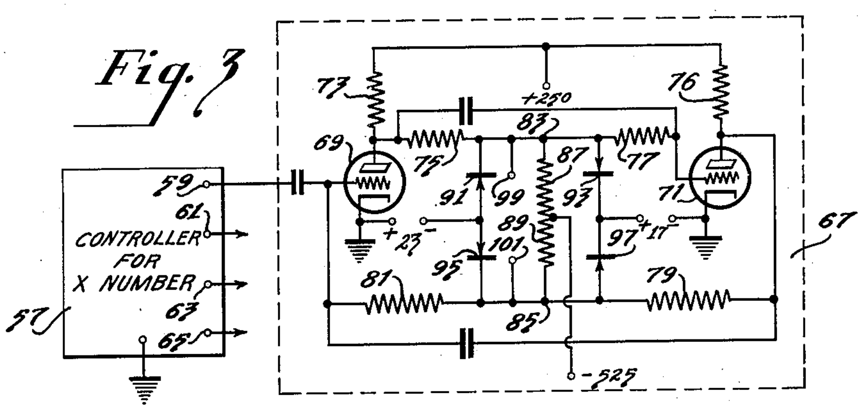
Figure 3 is a circuit diagram for an electronic switch.

In certain applications manually operated switches may be desirable for setting up the numbers to be added. However, it is frequently desirable to operate an adder electronically in response to electrical pulses. A novel electronic switch particularly adapted for use in conjunction with the adder of this invention is illustrated in Fig. 3.

Device 57 is a controller for establishing a positive pulse indicative of a "one" and a negative pulse indicative of a "zero" for each digital place of the adder. Assuming a four-place adder, four output terminals 59, 61, 63 and 65 are provided. Each output terminal is connected to the input of an electronic switch 67, only one of which has been illustrated. The switch comprises two tubes 69 and 71, having their cathodes grounded and their plates connected through resistors 73 and 76 to a suitable source of positive potential. The plate of tube 69 is connected to the grid of tube 71 through two resistors 75 and 77. The plate of tube 71 is connected to the grid of tube 69 through two resistors 79 and 81. These resistors may be shunted by a small capacitor to speed up the transfer of the condition of operation.

The mid-point 83 of resistors 75 and 77 is connected to a source of high voltage negative potential through resistor 87. The mid-point 85 of resistors 81 and 79 is connected to the same source of negative potential through resistor 89. Midpoint 83 is also connected through a rectifier 91 to a source of fixed negative potential of −23 volts and through a rectifier 93 to a source of fixed positive potential of +17 volts. Similarly, mid-point 85 is connected through a rectifier 95 to the −23 volt source and through a rectifier 97 to the +17 volt source.

The electronic switch 67 is basically a flip-flop having two conditions of stability. That is, either tube 69 is conducting and tube 71 cut off, or vice versa. The existing condition can be reversed by driving the grid of either tube positive or negative as may be required. In the case illustrated it is assumed that the controller provides positive and negative pulses alternatively to condition tube 69 as necessary. However, the controller may apply only positive or only negative pulses separately to the two tubes by providing the necessary additional output terminals.

The essential difference between the electronic-switch 67 illustrated and devices of this type previously known lies in the provision of means for limiting the output voltages to two fixed predetermined values, such as −23 and +17 volts, although other values may be produced as desired. The particular reason for selecting these values will appear subsequently. Voltage standardization is accomplished by restricting the swing of the output by rectifiers. The circuit constants are so selected that in the absence of the rectifiers the potentials of points 83 and 85 would swing far more positive and negative, respectively, than is ultimately desired.

Assuming that tube 69 is conducting, and tube 71 cut off, the potential at output terminal 99, which is connected to mid-point 83, will seek a potential more negative than −23 volts. At this point, however, rectifier 91 becomes equivalent to a very low impedance and holds the output at the −23 volt level applied to the rectifiers 91 and 95. Rectifier 93 is connected oppositely so that it presents a high impedance to point 83.

At the same time, the potential of output terminal 101 seeks a high positive level, since the plate of tube 71 is at a high potential. Rectifier 97, however, conducts as soon as the potential tends to exceed +17 volts, and holds the output at this value. Rectifier 95 is so connected that it presents a high impedance to the output terminal 101.

When the condition of conductivity of tube 69 and 71 is reversed, the potential at output terminal 99 is now held at +17 volts by rectifier 93, while the potential at output terminal 101 is held at −23 volts by rectifier 95.

It will thus be seen that output terminal 99 or 101 may be connected to one of the input terminals of the adder 1, of Fig. 1, depending on which polarity is chosen to represent "0" and "1." Two such devices are required for each digital position of the computer, one for the $x$ digit and one for the "$y$" digit. Thus one device 67 replaces each manual switch 19, 21, . . . 33.

Figure 4:
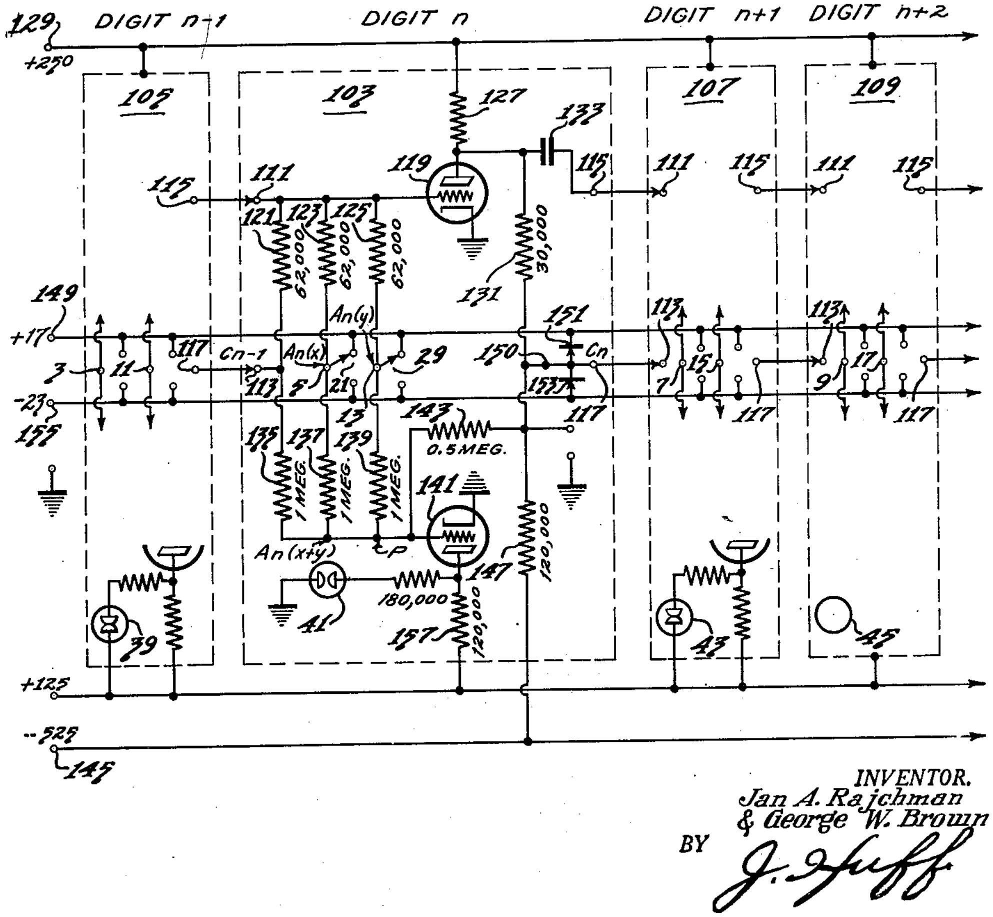
Figure 4 is the circuit diagram, partly in block diagram form, of a digital computer.

The circuit diagram of one stage 103 of the complete system is illustrated in Fig. 4. Because of the common practice of reading circuit diagrams from left to right, the sequence of the cascaded stages 105, 103, 107, 109 representing the digital places of successively higher order is shown in the reverse order from that previously used. Again it has been assumed that the complete adder includes any number of stages, and since all stages are identical only one has been shown in detail, representing for example the digit $n$, while the preceding stage 105, representing the digit $n-1$, and the two succeeding stages 107 and 109 representing digits $n+1$ and $n+2$, have been shown in block diagrammatic form.

Each stage includes two coupling input terminals 111 and 113 for connection to the two coupling output terminals of the preceding stage, and two coupling output terminals 115 and 117 for connection to the corresponding coupling input terminals 111 and 113, respectively, of the succeeding stage. Of course, the coupling input terminals of the first stage and the coupling output terminals of the last stage will not be used normally. In addition, the four stages have the two groups of digit input terminals 3, 5, 7 and 9 for the $x$ number, and 11, 13, 15 and 17 for the $y$ numbers respectively, as shown in Figs. 1 and 3. Finally each stage is connected to the necessary sources of biasing and energizing potential as will appear subsequently.

The internal circuit connections of the $n$th stage 103 will now be described, it being understood that all the corresponding components of the other stages are connected identically.

Coupling input terminal 111 is connected to the grid of a carry-over triode 119, the cathode of which is grounded. This grid is also connected to one end of three resistors 121, 123 and 125 of equal value, say 62,000 ohms. The other ends of these resistors are connected to coupling input terminal 113 ($c_{n-1}$), the $x$ digit input terminal 5, ($a_n(x)$), and the $y$ digit input terminal 13, ($a_n(y)$), respectively. The plate of triode 119 is connected through a plate load resistor 127 to a source of positive plate potential 29; through an output resistor 131 to coupling output terminal 117; and through a small coupling capacitor 133 to coupling output terminal 115.

Three additional resistors 135, 137 and 139 of equal value, say one megohm, are connected between point P which is connected to the grid of amplifier tube 141 and coupling input terminal 113; the $x$ digit input terminal 5; and the $y$ digit input terminal 13, respectively. A feedback resistor 143 is connected from the grid of tube 141, to coupling output terminal 117 and also to a source of high negative potential 145 through a biasing resistor 147. Terminal 117 is connected to a source 149 of fixed potential having a value of +17 volts through a rectifier 151 connected so that it will conduct when the potential applied to the terminal tends to exceed +17 volts. A second rectifier 153 is connected between terminal 117 and a source 155 of fixed potential having a value of −23 volts so that it will conduct when the potential applied to the output terminal tends to exceed −23 volts.

The voltage $a_n(x+y)$ appearing at point P will have one value or another indicative of the digital value of the sum of the two numbers of the $n$th digit to be added. However, in order to provide sufficient voltage to operate a neon indicator lamp 41, tube 141 has been provided. Lamp 41 is connected between the plate of tube 141 and ground. Thus the process of addition is completed with only 1 tube (119) per digital position, tube 141 simply being an amplifier added for convenience.

The operation of the digital adder will now be explained. The voltage applied to coupling input terminal 113 from the preceding stage 105 is the "carry over" voltage $c_{n-1}$ and may be either +17 volts or −23 volts as will appear subsequently. Thus the voltages $c_{n-1}$, $a_n(x)$ and $a_n(y)$ applied to the lower ends of the three resistors may be +17 or −23, in any combination. The resultant voltage applied to the grid of carry-over tube 119 will be an average value as shown in Table II, considering all possible permutations:

*Table II*

| Table I | Terminals | | | Carry-over Tube Grid Voltage | $C_n$ |
|---|---|---|---|---|---|
| | 113 ($c_{n-1}$) | 5 ($a_n(x)$) | 13 ($a_n(y)$) | | |
| $g$ | −23 | −23 | −23 | −23 | +17 |
| $f$ | −23 | −23 | +17 | approx. −10 | +17 |
| $e$ | −23 | +17 | +17 | approx. +4 | −23 |
| $d$ | +17 | +17 | +17 | +17 | −23 |

Tube 119 is of the conventional type which is completely cut off by a grid bias of the order of −5 volts, and saturates with positive grid bias.

The three resistors 127, 131 and 147 are so selected and the potentials applied to terminals 29 and 145, with respect to ground, are so chosen that when tube 119 is conducting the potential $c_n$ applied to coupling output terminal 117 tends to assume a value lower than −23 volts, but the actual potential is limited to −23 volts by rectifier 153. Similarly, when tube 119 is cut off the potential $c_n$ tries to assume a value more positive than +17 volts, but is limited to that value by rectifier 151. Thus the carry-over voltage $c_n$ will have the values shown in the chart above. It will be noted that the sense of the voltage $c_n$ is reversed with regard to the convention adopted for the other voltages. That is, if −23 volts represents zero, then $c_n$ is zero when all three input voltages are zero. However, $c_n$ is +17. This reversal may be corrected in several ways, as will appear below.

A similar averaging is accomplished by the four resistors 135, 137, 139 and 143. It should be noted, however, that feedback resistor 143 has one half the resistance of the other three. Thus it adds effectively twice the carry-over voltage, since it has twice the effect of the other three resistors when connected to a point of the same voltage amplitude. For convenience, it can be considered as equivalent to two resistors of the same value as the others connected in parallel to the same point. The resultant sum voltage $a_n(x+y)$ at point P which is also applied to the grid of amplifier tube 141 will therefore be as shown in Table III:

*Table III*

| Table I | $C_{n-1}$ | $A_n(x)$ | $A_n(y)$ | $C_n$ | $C_n$ | Sum Voltage $a_n(x+y)$ at point P | Lamp 41 |
|---|---|---|---|---|---|---|---|
| $g$ | −23 | −23 | −23 | +17 | +17 | −7 | Lit |
| $f$ | −23 | −23 | +17 | +17 | +17 | +1 | Out |
| $e$ | −23 | +17 | +17 | −23 | −23 | −7 | Lit |
| $d$ | +17 | +17 | +17 | −23 | −23 | +1 | Out |

If it is desired that +17 volts represent a "one" and −23 volts represent "zero" uniformly throughout all stage of the adder, a D. C. amplifier may be inserted in the carry-over output lead at point 150. This will reverse the sense of $c_n$ so that it will correspond to the convention used in the stage being considered. It should be noted, however, that the convention that +17 volts input will represent a "one" and −23 volts input will represent a "zero" is purely a matter of choice, and that the reverse relationship may be adopted or the convention may alternate from one stage to another so long as a uniform scheme is employed to indicate the resultant sum. Consequently, a great simplification may be achieved and an additional amplifier made unnecessary simply by reversing the sense of the digit selector switches at successive stages. This may be done either by reversing the electrical connections alternatively from terminals 149 and 155 to the selector switches, as shown in Fig. 2, or simply by considering the "up" position of the switches of one stage as "one" and the "down" positions of the next place as "one," as in Fig. 4.

Keeping this fact in mind, the requisites set forth in lines $d$ to $g$ of Table I for the determination of the value of the carry-over $c_n$ can be compared with the actual conditions shown in Table II, and it will be observed that the required relationship has been met. The applicable lines of Table I have been indicated in Table II on the assumption that in the $n$th digital place being considered, −23 volts is applied to the digit input terminals $c_{n-1}$, $a_n(x)$ or $a_n(y)$ to represent "1" and +17 volts to represent "0," while the place $n+1$ uses the opposite representation, and thus a carry-over voltage $c_n$ of −23 volts from digit $n$ represents a "0" when applied to digital place $n+1$, and so on.

Tube 141 is similar to tube 119 in that it is fully cut off when its grid voltage is more negative than −6 volts, and saturated when its grid voltage is positive. Consequently lamp 41 is lit only when tube 141 is cut off and there is no voltage drop across resistor 157, and is out when the tube is conducting. Table III indicates the condition of lamp 41 as a function of the potential applied to the grid of tube 141.

Assuming that for all digital place a "1" is signified when the indicator lamp is lit, Table III may be compared to the requisite conditions of Table I as to the sum $a_n(x+y)$. The applicable lines of Table I have been shown in Table III for convenience. It will be observed that the lamp is lit in each case where the sum of $a_n(x+y)$ is equal to 1, and out in each case where the sum is 0.

In the digital place $n-1$ and $n+1$ it has been noted that the application of −23 volts is used to represent a zero. This of course reverses the polarity of the voltage applied to tube 141, and it is therefore necessary to connect the indicator lamps of alternate digital adders so that they light when the tube is conducting. This is easily accomplished by connecting the neon lamp in parallel with the equivalent of plate resistor 157, as shown in digital places 105 and 107 in Fig. 4.

It is to be understood that the manual switches shown in Fig. 4 may be replaced by an equal number of electronic switches of the type illustrated in Fig. 3. The reason for limiting the output of the electronic switch to the two voltages +17 and −23 volts will now be apparent. The proper sense for any given digital stage may be obtained by connecting the adder input terminal to terminal 99 or 101 as may be desired.

It should be noted that, if desired, the two fixed voltages may be +20 and −20. In such a case, however, it will be necessary to provide additional bias for the various tubes. The use of the voltages suggested provides the necessary bias automatically. It should also be noted that distinct sum voltages indicative of the value of $a_n(x+y)$ for each digital place are available at the grid of amplifier tube 141. These voltages may be used directly to actuate other apparatus or other types of indicators, in which case only one tube per digital place is required. This is a substantial simplification of the systems previously known.

The function of coupling capacitor 133, and the equivalent capacitor utilized in the other stages, is to speed up the transfer of the carry-over voltage to the following stage. The ultimate condition is, of course, dependent only on the D. C. condition, but where high speed operation is desired, this capacitor may be employed to advantage.

The use of rectifier limiters has the advantage that the accuracy of computation is not affected by changes in tube characteristics, and is not effected by substantial changes in the amplitudes of the energizing potentials. The operation is positive and definite, and is therefore extraordinarily free from error.

The use of the adder for obtaining the difference between two numbers was discussed above in connection with Fig. 2. It will now be understood that the sense reversing switch 51 may be embodied in the complete system illustrated in Fig. 4. Lead 55 which adds "1" to the indicated difference is connected to the carry-over input terminal of the first digital place adder. Since there is no digital place preceding the first or "units" place, the carry-over input for this digit adder is not required for carry-over purposes, and is thus available for inserting the "1" required for the reasons given fully above. In its "add" position, switch 51 applies a "zero" to the carry-over input of the first or "units" place. This makes all stages alike, and simplifies the construction.

What we claim is:

1. An electronic adder comprising a plurality of cascaded stages, each stage representing one place in a system of numeration; a first group of digit input terminals, one for each stage; a second group of digit input terminals, one for each stage; means for applying selectively to each terminal voltages representative of the values of corresponding digits of two numbers to be added; said cascade stages being connected for reversing said voltages in polarity every alternate stage, and each stage including means for producing a carry-over voltage representative of the value of the carry-over digit to be added to the next succeeding place; and means for combining in each stage the voltages representative of the two digits to be added in that stage, the carry-over voltage from the preceding stage and effectively twice the carry-over voltage produced in the stage considered to produce an output voltage representative of the value of the corresponding digit of the sum of said two numbers.

2. A device of the character described in claim 1 which includes, in addition, means for visually indicating the value of said output voltage.

3. A device of the character described in claim 1, having only one electronic computing tube for each stage.

4. An electronic adder comprising a plurality of cascaded stages, each stage representing one place in the binary system of numeration; a first group of digit input terminals, one for each stage; a second group of digit input terminals, one for each stage; means for applying selectively to each terminal of the first group a voltage representative of the value of a corresponding digit of a first number; means for applying selectively to each terminal of the second group a voltage representative of the value of a corresponding digit of a second number; said cascaded stages being connected for reversing said voltages in polarity every alternate stage; means for producing in each stage and applying to the next successive stage a carry-over voltage representative of the digit to be added to said successive stage, and means for combining in each stage the voltages representative of the two digits to be added in that stage, the carry-over voltage from the preceding stage and effectively twice the carry-over voltage produced in the stage considered to produce a resultant voltage representative of the value of the corresponding digit of the sum of said first and second numbers.

5. An electronic adder comprising a plurality of cascaded stages, each stage representing one place in the binary system of numeration; a first group of digit input terminals, one for each stage; a second group of digit input terminals, one for each stage; means for applying selectively to each terminal a first voltage representing the digit zero or a second voltage representing the digit one, means for producing in each stage and applying to the stage of next higher order a carry-over voltage having the same value as one or the other of said first and second voltages but of opposite representation, and combining means for combining in each stage the first and second voltages applied thereto, the carry-over voltage from the stage of next lower order and effectively twice the carry-over voltage produced in the stage considered to produce resultant voltages representative of the digits of the sum of the numbers represented by the voltages applied to said first and second groups of terminals.

6. A device of the character described in claim 5, in which said means for producing a carry-over voltage includes a thermionic tube having input and output electrodes and a plurality of resistors for applying the digit-representing voltages and the carry-over voltage from the stage of next lower order, respectively, to said input electrodes.

7. A device of the character described in claim 6, in which said combining means comprises three resistors of equal value and a fourth resistor of one half the value of any one of said three resistors, said resistors being connected together at one end, the other ends being connected, respectively, to points at which said first and second voltages, said carry-over voltage from the stage of next lower order, and the carry-over voltage produced in the stage considered are available, said resultant voltage being developed at the point of common connection of said resistors.

8. A device of the character described in claim 7, which includes means responsive to said resultant voltage for producing a visual indication thereof.

9. An electronic adder comprising a plurality of cascaded stages, each stage representing one place in the binary system of numeration; a source providing two input voltages $V_1$ and $V_2$; a pair of input terminals for each stage; switching means for applying either voltage $V_1$ or $V_2$ to each of said input terminals, said voltages being applied in accordance with a predetermined representation of the values of corresponding digits of two numbers to be added; each stage including a carry-over tube; means for controlling the conductivity of said tube in accordance with the voltages $V_1$ and $V_2$ applied to the stage considered and the preceding stage to produce a carry-over voltage for the next succeeding stage, said carry-over voltage having one of two values equal to the values of voltages $V_1$ or $V_2$; said cascade connected stages being connected for reversing said voltages in polarity every alternate stage; and means for combining in each stage the two input voltages, the carry-over voltage from the preceding stage and effectively twice the carry-over voltage produced in the stage considered to produce a resultant voltage representative of the value of the digit of the corresponding place of the sum of said two numbers to be added.

10. A device of the character described in claim 9, in which the amplitudes of voltages $V_1$ and $V_2$ are such that said carry-over tube is driven to one condition of conductivity when less than two of three applied voltages have a given value, and to the opposite condition of conductivity when two or more of the applied voltages have said given value.

11. A device of the character described in claim 10, wherein the carry-over voltage produced in each stage varies in accordance with the conductivity of said carry-over tube, the variation tending to exceed said values equal to the values of voltages $V_1$ and $V_2$, and in which limiting means is provided for limiting said carry-over voltage to values approximately equal to the values of voltages $V_1$ and $V_2$.

12. An electronic adder comprising a plurality of cascaded stages, each stage representing one place in the binary system of numeration; a source providing two input voltages $V_1$ and $V_2$; a pair of input terminals for each stage; a switch for each stage having two positions of operation corresponding to the digits "one" and "zero," respectively, and connected to said source for applying to one input terminal of each stage voltages $V_1$ and $V_2$; another switch for each stage connected to the other input terminals and having two positions of operation corresponding to the digits "one" and "zero," respectively; a reversing switch connecting said other switches to said source whereby the voltages applied to said other input terminals in given positions of said other switches may be interchanged; means responsive to the operation of said reversing switch for applying to the first stage of said adder a voltage representing the digit "one," and means responsive to the voltages applied to the individual stages of said adder for producing an indication of the sum or difference of the binary numbers represented by said voltages, depending upon the position of said reversing switch.

13. An electronic adder comprising a plurality of cascaded stages, each stage representing one place in the binary system of numeration and including a single computing tube; means for applying to each tube digit-representing voltages representative of the corresponding digits of two numbers to be added and a carry-over input voltage from the preceding stage; means for establishing in the anode circuits of said tubes carry-over output voltages to be transferred to the succeeding stage; and means including a resistance network in each stage for combining said digit-representing voltages, and said carry-over input and output voltages for indicating the sum of said numbers.

14. A device of the character described in claim 13, in which said carry-over output voltage is equal in amplitude to one or the other of said digit-representing voltages.

15. An electronic adder comprising a plurality of cascaded stages, each stage representing one place in the binary system of numeration and including only one computing tube; means for applying to said tube in each stage digit-representing voltages representative of the values of the digits in corresponding places of two numbers to be added, a voltage of one amplitude corresponding to the digit "one" and a voltage of another amplitude corresponding to the digit "zero" in the first of said stages and corresponding in reverse order in alternate successive stages; means for applying to said tube in each stage a carry-over input voltage from the preceding stage; means for establishing in the anode circuits of said tubes carry-over output voltages to be transferred to the succeeding stage; and means including a resistance network in each stage for combining said digit-representing voltages and said carry-over input and output voltages for indicating the sum of said numbers.

16. A device of the character described in claim 15, in which said resistance network comprises three resistors of equal value and a fourth resistor having a resistance value equal to one-half of any one of said three resistors, one end of each resistor being connected to a common point at which a voltage is developed indicative of the digital value of the sum of said numbers for the place considered, the other ends of said resistors being connected to points at which said carry-over input voltage, said digit-representing voltages and said carry-over output voltage are available.

17. A device of the character described in claim 15, which includes means for limiting said carry-over output voltage to one or the other of two amplitudes equal to the amplitudes of said digit representing voltages depending upon whether or not the sum of the digits applied to the stage considered is greater than one.

18. The method of adding two numbers having digits of "one" or "zero" in accordance with the binary system of numeration, which includes the steps of establishing pairs of voltages of one or the other of two predetermined amplitudes for the successive places of the numbers to be added, the amplitudes of the voltages in the $2^n$ places, where $n$ is an even number including zero, having one relationship to the values of the digits in the same place, and the amplitudes of the voltages in the $2^{n+1}$ places having the opposite relationship to the values of the digits; combining each pair of voltages with a carry-over voltage from the preceding place to produce a carry-over voltage for the succeeding place having an amplitude representative of the digit "one," in accordance with the relationship applicable to said succeeding stage, if the combined voltages represent a digital sum greater than one; combining each pair of voltages with said carry-over voltage from the preceding place and with the carry-over voltage for the succeeding place to produce a resultant voltage of one value if the value of the digit in the corresponding place of the sum of said two numbers is a "one" and another value if the value of the digit is a "zero"; and producing visual indications of the values of the respective digits of the sum of said numbers.

19. The method of adding two binary numbers as set forth in claim 18, wherein one of said numbers has a negative value which includes the additional step of reversing the relationship between all voltages representative of the respective digits of the negative number and adding one to the indicated sum.

JAN A. RAJCHMAN.
GEORGE W. BROWN.

REFERENCES CITED

The following references are of record in the file of this patent:

UNITED STATES PATENTS

| Number | Name | Date |
|---|---|---|
| 2,404,250 | Rajchman | July 16, 1946 |
| 2,425,131 | Snyder | Aug. 5, 1947 |
| 2,428,812 | Rajchman | Oct. 14, 1947 |
| 2,429,227 | Herbst | Oct. 21, 1947 |